United States Patent [19]
Curtis

[11] 3,915,320
[45] Oct. 28, 1975

[54] TOW TRUCK LIFT HITCH

[76] Inventor: Joseph Curtis, 328 W. Green St., Mechanicsburg, Pa. 17055

[22] Filed: Jan. 3, 1975

[21] Appl. No.: 538,307

[52] U.S. Cl............................................... 214/86 A
[51] Int. Cl.² ......................................... B60P 3/12
[58] Field of Search..................... 280/402; 214/86 A

[56] References Cited
UNITED STATES PATENTS

| | | | |
|---|---|---|---|
| 2,045,793 | 6/1936 | Pearson et al. | 214/86 A |
| 2,111,341 | 3/1938 | Tetrault | 214/86 A |
| 2,183,478 | 12/1939 | Holmes et al. | 214/86 A |
| 2,726,777 | 12/1955 | Wiley | 214/86 A |
| 3,137,401 | 6/1964 | Curtis | 214/86 A |
| 3,599,811 | 8/1971 | Watkins | 214/86 A |

*Primary Examiner*—Leo Friaglia
*Attorney, Agent, or Firm*—Albert H. Kirchner

[57] ABSTRACT

A hitch for connecting a disabled motor vehicle to a tow truck having a central winch and an elevated rear pulley comprises lever means fulcrumed on a spacer strut projecting rearwardly from the truck, with the power arm of the lever means connected to a line from the winch trained over the pulley and its work arm coupled to an end portion of the vehicle so that operation of the winch swings the lever means about the fulcrum to lift the work arm and the coupled end of the vehicle.

8 Claims, 5 Drawing Figures

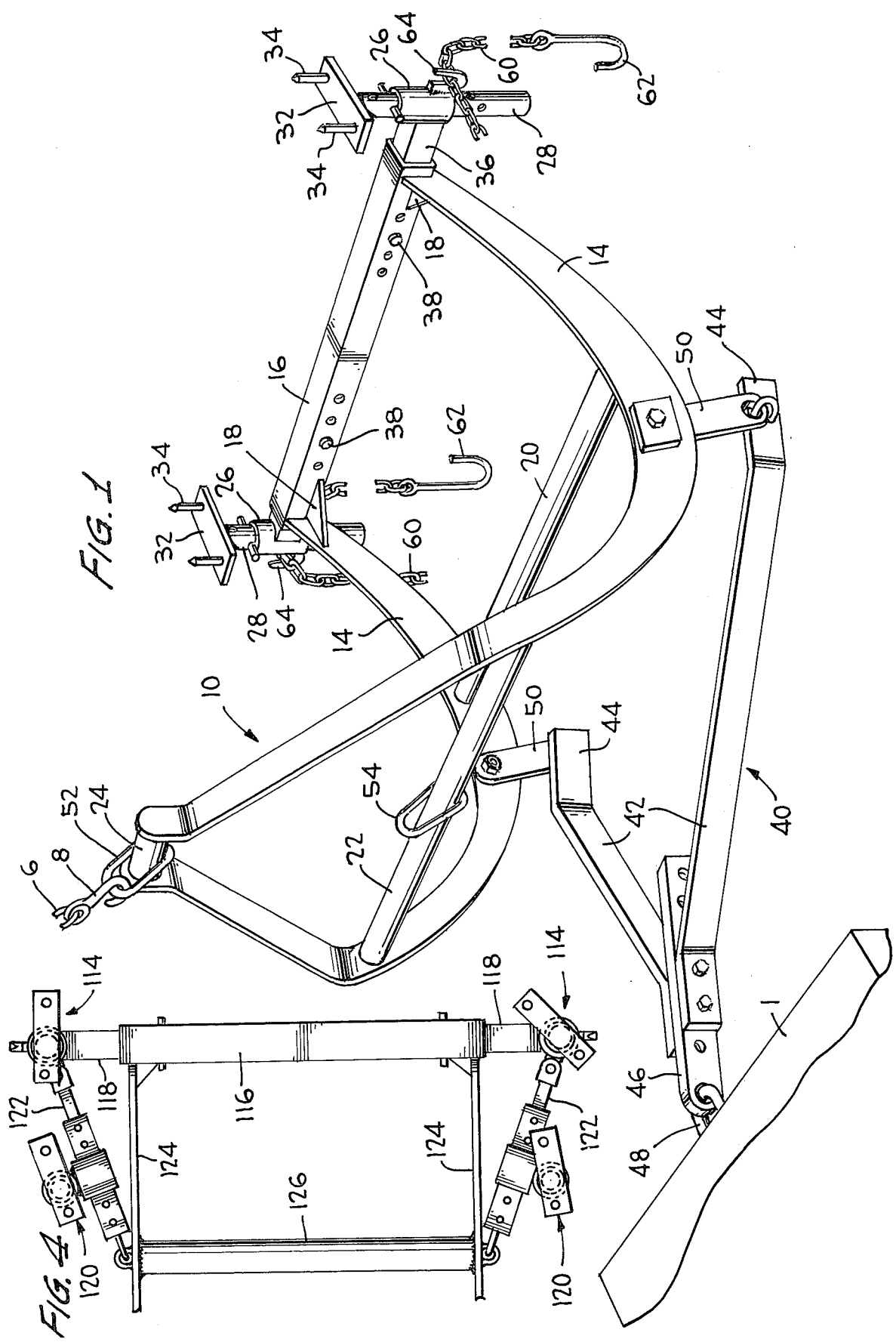

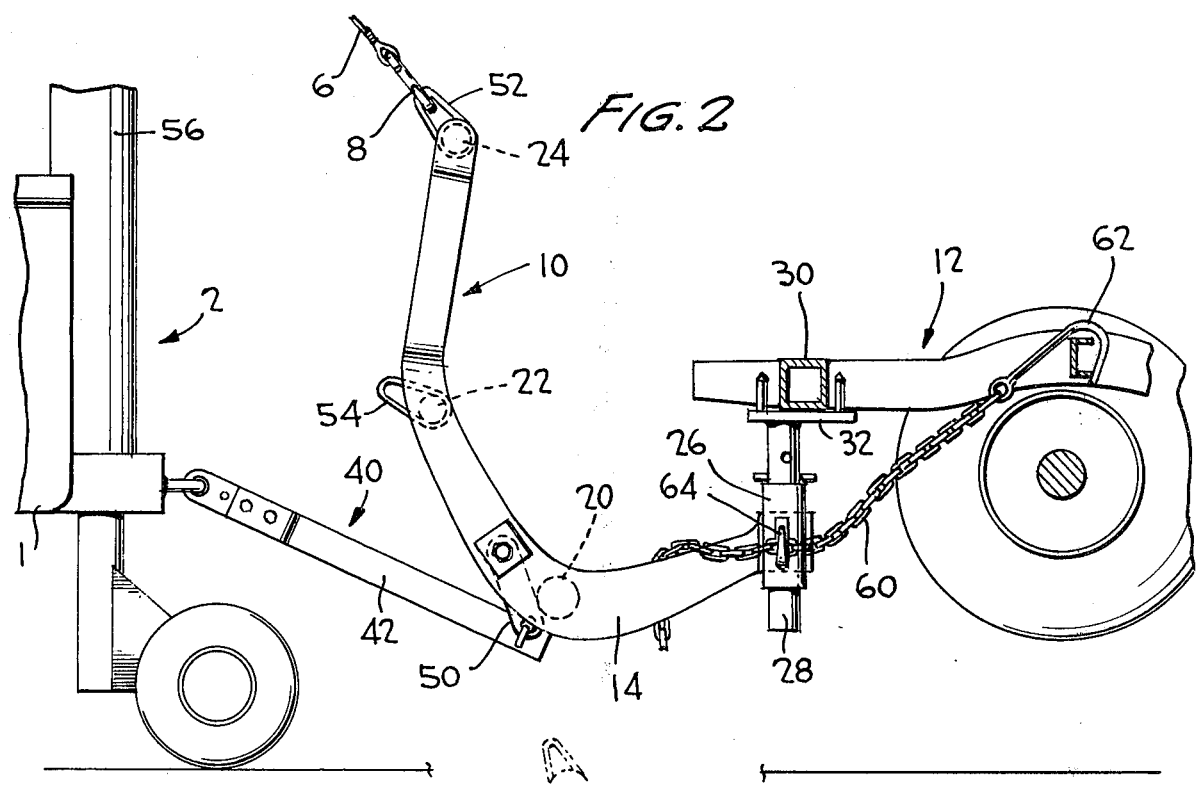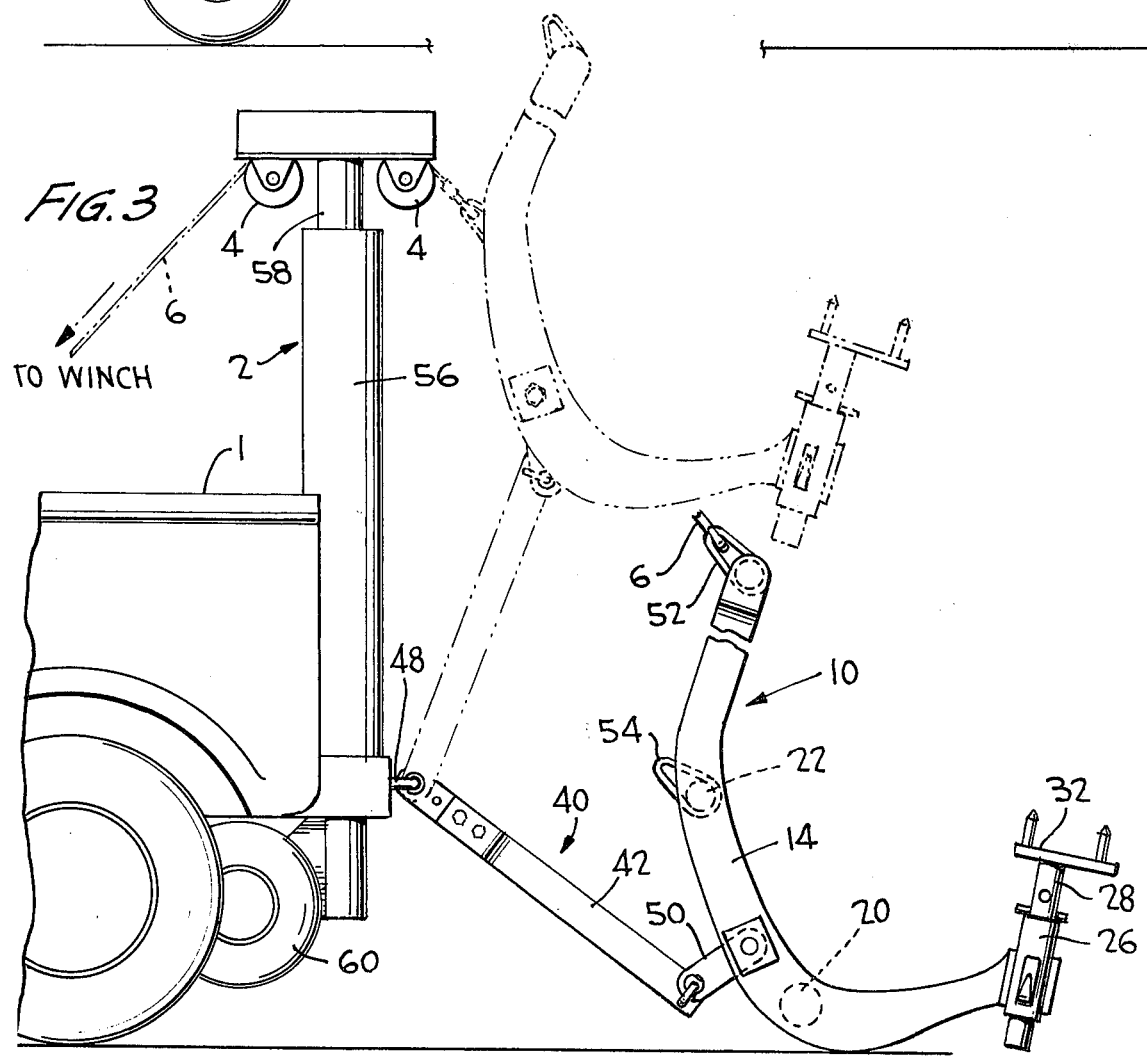

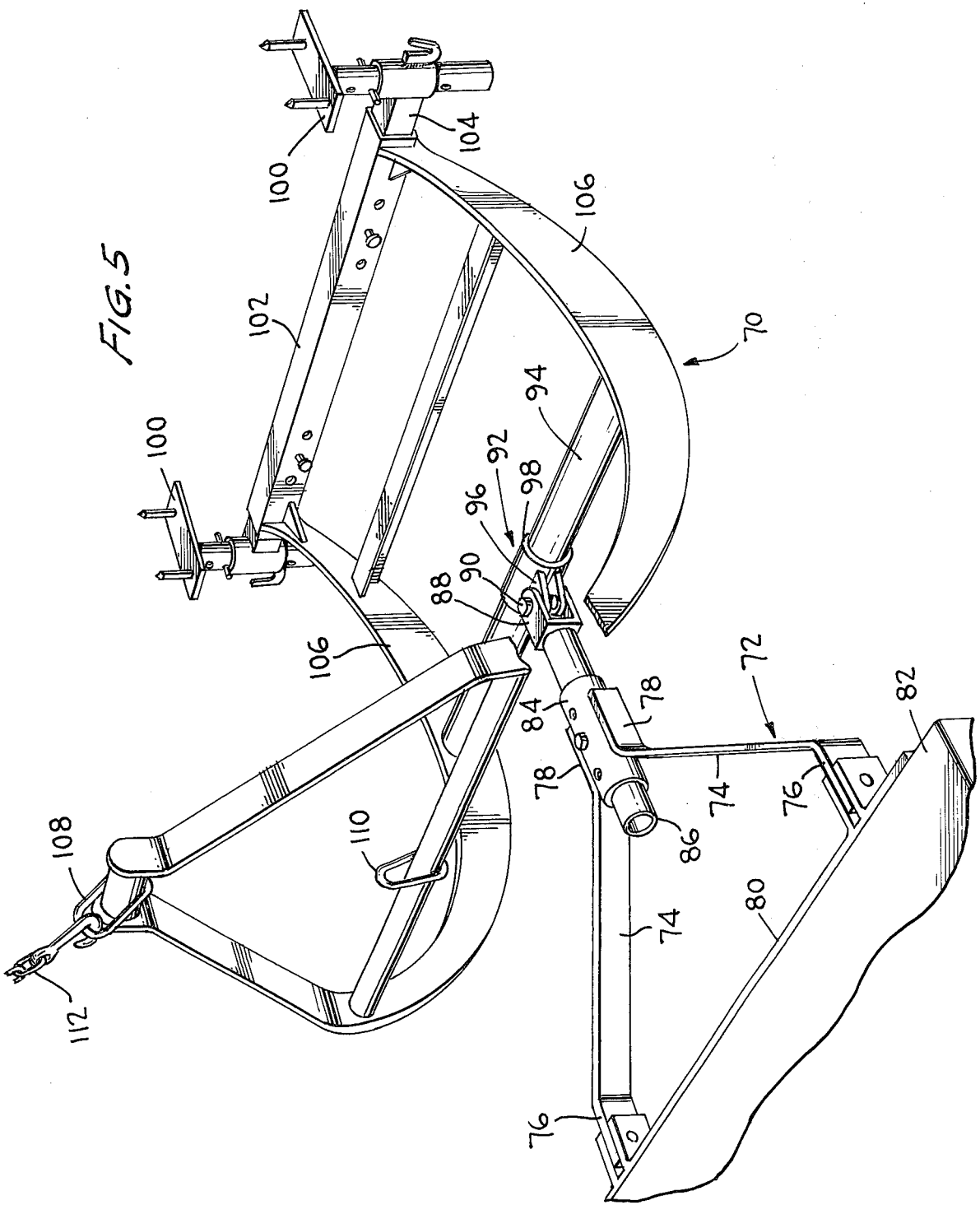

TOW TRUCK LIFT HITCH

BACKGROUND OF THE INVENTION

The present invention relates to tow truck lift hitches and provides an improved attachment for the rear of a tow truck for effecting connection to a vehicle to be towed, typically a disabled automobile, which will elevate one end of the vehicle and transmit towing or pulling force from the truck.

Tow trucks designed for the foregoing use are in some cases specially constructed, with bodies or beds having built-in tow connections, power lift apparatus, coupling means, stowing arrangements, etc., so that use of the truck for purposes other than towing of disabled motor vehicles is virtually impossible. Moreover, in most cases the prior art towing equipment must be designed for heavy duty, at correspondingly high expense, if it is to be versatile in accommodating heavy as well as light loads, or must be limited to the handling of light loads if built with more economical light power means and mechanical structure.

SHORT SUMMARY OF THE INVENTION

The invention aims to provide improvements over the best known prior art lift hitches in respect of versatility of load capacity, ease of connection, disconnection, elevation of the adjacent end of the disabled vehicle to towing position, and consignment of the hitch to stowed position, all by simple mechanism involving low initial cost of construction and requiring no expensive heavy duty power means for its operation.

These objectives are accomplished by novel equipment that can be readily applied to any existing flat bed truck body, requiring no addition to the interior of the truck except installation of a winch driven by a small, low horsepower electric motor through speed reduction gearing, and no attachment to the tail of the truck except a pulley-mounting post and a hinged spacer strut.

The stated results are attained in part by incorporating in the lift mechanism a novel leverage action that enables the low powered winch to elevate heavy loads by mechanical advantage of lever means of the first order fulcruming about the spacer strut.

SHORT DESCRIPTION OF THE DRAWINGS

In the accompanying drawings, which form part of this application for letters patent and which depict the invention in certain preferred forms of embodiment which have been reduced to actual practice and found to give entirely satisfactory results, and which are accordingly at present preferred, FIG. 1 is a perspective view of a preferred form of the hitch;

FIG. 2 is a side elevational view showing the hitch connected to a tow truck and to a vehicle to be towed, with the hitch in operating relation to the truck and vehicle, i.e., in towing position;

FIG. 3 is a side elevational view showing the hitch connected to the rear portion of a tow truck: in full lines in position for becoming connected to a vehicle to be towed (not shown), and in broken lines in the inoperative position in which it is stowed on the truck when not in use;

FIG. 4 is a detail top plan view of a modification of the rear portion of the lever means element of the hitch; and FIG. 5 is a perspective view, like that of FIG. 1, but showing a modified form of the preferred embodiment.

DESCRIPTION OF THE PREFERRED EMBODIMENTS

In these drawings, where FIGS. 1, 2 and 3 whow the preferred embodiment of the invention, the reference numeral 1 designates the rear portion of a conventional light flat bed motor truck. At any convenient point on the truck bed there is securely mounted, as by heavy bolts standing into frame members of the truck, a small winch or windlass having a light-powered electric motor coupled thereto by speed reduction gearing, all of which can be conventional and none of which is shown in the drawings.

Bolted or otherwise securely attached to the tail of the truck is a post 2 on the top of which is mounted a pulley, or a pair of pulleys, 4, entraining a line 6, e.g., a cable or chain, which has one end connected to the winch in winding relation thereto and its other end hanging free and terminating in a hook 8 for separable connection to the novel hitch mechanism per se of the invention.

The hitch mechanism comprises a cradle constituting a lever means 10 designed to make lifting and pulling connection between the tow truck 1 and the vehicle to be towed, typically a disabled automobile, certain conventional principal structural parts of one end portion of which are shown at 12 in FIG. 2. The lever means 10 that forms the cradle comprises a pair of arcuately curved arms 14 of special shape, providing a frame of appreciable width at its rear and tapering to a small separation of the arms at its forward end, as best shown in FIG. 1. There, it will be noted, the arms are connected at the rear by a rear cross member 16 rigidly secured to the arms as by welding and gussets 18, by an intermediate cross member 20, and by a forward cross member 22, and by a front terminal stub cross member 24, all rigidly secured to the arms as by welding, so that the arms and members constitute a strong, rigid frame, herein called the lever means 10 of the hitch.

The rear cross member 16 differs from the round tubular or rod stock of the members 20, 22, 24 by being of square tubular cross section. It holds telescopically a pair of bars 36 of cross sectional shape fitting the member, one bar projecting from each end of the member, and each adjustably fixable in and out of the member by matching holes in the member and the bar receiving adjusting pins 38. The projecting end of each bar 36, extending beyond the adjacent arm 14, has welded to it a short upright sleeve 26 receiving a short vertical post 28 terminating in its upper end in a fitting adapted to underlie in supporting connection an area of the bottom of one of the end cross members 30 of the frame of the vehicle 12, as shown in FIG. 2. The post 28 may be made vertically adjustable in the sleeve 26, as by a pin standing through any of a series of holes in the post, or in any other conventional manner. The fitting may consist of a flat horizontal plate 32 with spaced upstanding abutment pins 34 for nesting the vehicle frame member, or it may comprise any other convenient design for holding the member in supported towable position, against movement forwardly or rearwardly.

It will be obvious that the two bars 36 can be extended equally so as to center the lever means 10 symmetrically in supporting connection to the frame of a vehicle 12 of any of a very considerable range of widths.

Strut means, designated generally 40, comprises a frame formed of two flat bars 42 specially shaped and related so as to form a generally V-shaped frame providing at its forward end a vertex for connection to the rear of the tow truck and to have at its rear end relatively widely spaced terminal ears 44, separated by just slightly less than the distance between the lever means arms 14 a short distance in front of the intermediate cross member 20 of the lever means. The forward vertex holds in securely clamped relation, which may be made adjustable by bolts standing through matching holes, as shown in FIG. 1, a forwardly projecting tongue 46 which is pivoted at its extended front end to a lower portion of the tow truck 1 as shown at 48. Each of the rear terminal ears 44 of the strut means has pivoted to it one end of a short strap 50, the other end of which is pivoted to the adjacent arm 14 of the lever means a distance in front of the intermediate cross bar 20 of the lever means that is determined by the length of the strap. The arrangement is such that, while the straps, which are designated fulcrum-providing linkage means in the claims appended to this application, are normally free to hang down from the arms 14 as shown in FIG. 1, or to project forwardly from the arms as shown in Full lines in FIG. 3 when the lever means 10 rests on the ground, they will swing about their pivoted ends and bring their edges into contact with the intermediate cross member 20 if the lever means be pulled forward toward the position shown in FIG. 2. Thus the straps 50 are fulcrum-providing linkage means, and their edges become fulcrums, and the points or surfaces on the cross member 20 at which they contact the member are fulcrum surfaces, and the carriage formed by the arms 14 becomes a lever of the first order, of bellcrank form, which will turn about its fulcrum and elevate the two rear arms, as a unit, and elevate also the end of the vehicle supported by those arms, when the forward portions of the arms are pulled forwardly toward the tow truck.

This is the leverage lifting action performed by the hitch, produced by connecting the cable or chain hook 8 to the forward end cross bar 24 of the cradle 10, conveniently made by means of an eye 52 welded to the bar.

By virtue of this leverage action, the operating load on the winch and its motor is minimized, and heavy vehicle loads can be elevated with ease even though the winch power is minimal.

It will be understood that connection of the hitch to the vehicle to be towed is initiated with the parts in the position shown in full lines in FIG. 3, with the cradle frame 10 resting on the ground and the fitting plates 32 underlying those parts of the vehicle frame, e.g., its cross member 30, which are to be engaged by the fittings. Operation of the winch then swings the cradle as explained, initially bringing the fulcrum surfaces of the straps 50 and the cross member 20 into contact with each other, and then elevating the fittings into supporting engagement with the frame member 30, and thereafter, on continuing pull of the line 6, lifting the member 30 and the adjacent end of the vehicle 12.

The hitch may be elevated, above its operative, towing position shown in FIG. 2, to the higher position shown in broken lines in FIG. 3, for the purpose of stowing the hitch when the tow truck is to be parked or driven unconnected to a towed vehicle. For this purpose an eye 54, similar to the eye 52, may be welded to a central location on the forward cross bar 22 of the lever means 10. Connection of the hook 8 to this eye, and operation of the winch to the limit permitted by the line 6, will lift the lever means to the broken line position of FIG. 3, in which it is held stabilized by the strut means 40 and the line, securely and out of the way for road movement of the truck.

For purposes of the inventive combination of the present invention the pulley post 2 may take any operative form providing a sufficiently secure mounting on the truck. A convenient and preferred form is suggested by the showing in FIGS. 2 and 3. This consists in a hollow standard 56 fixed on the truck, telescopically holding a mast 58 which mounts the pulley means 4 at its top and is supported by a caster type road wheel means at its bottom. Any convenient means, e.g., matching holes and insertible pins, may be incorporated for effecting desirable height adjustment of the mast and pulleys, as will be understood. A more sophisticated type of tow truck pulley mounting post is the subject of my U.S. Pat. No. 3,137,401, issued June 16, 1964.

It may be desirable in some cases to lash the rig securely to the vehicle to be towed. For this purpose chains 60 can be provided adjacent to the two fittings. As shown in FIGS. 1 and 2, each chain terminates in a hook 62 which can be engaged over one of the internal cross members of the vehicle 12. The chain can then be pulled tight and anchored by catching a link in a U-shaped keeper 64 welded onto the adjacent fitting sleeve 26. One advantage of this lashing feature is that it allows the spacing between the pins 34 of the fittings to be made wide enough to accommodate the very widest frame cross members 30 without allowing clearance for rattling when the fittings have to be applied to considerably narrower members, inasmuch as in such cases each chain can be pulled up tight to hold one of the pins in contact with the member.

It will be recognized that with the parts in the towing position of FIG. 2, forward movement of the tow truck is transmitted to the hitch and hence to the vehicle 12 through the line 6, and not through the strut means 40. During towing movement, the strut means functions as a spacer, to hold the hitch, i.e., the lever means 10, spaced properly behind the tow truck, with only limited freedom of movement forwardly and rearwardly relative to the truck by swinging of the links 50 toward and from the cross member 20.

The foregoing is the preferred form of the invention.

A modified form, shown in FIG. 5, differs from the embodiment of FIGS. 1, 2 and 3 in respect of the strut spacer means and its fulcrum relationship to the lever means, as will now be explained.

In FIG. 5 the lever means 70 is substantially the same as the lever means 10 of the previously explained embodiment. The difference in the hitch is in the strut means, designated 72 in the figure, and in the fulcrum-providing linkage means which cooperates with the fulcrum surface of a cross member of the lever means. This modified strut means comprises a pair of flat bars 74 specially formed with front terminal ears 76 and rear terminal ears 78 at opposite ends of an intermediate angular portion. The front ears are hinged to widely separated sockets formed on a lateral base bar 80 which is bolted to the rear of the tow truck 82, and the rear ears 78 are welded to opposite sides of a sleeve 84. Telescopically mounted in this sleeve is a short rod or tube 86 which optionally may or may not be adjustably fixed in varying degrees of rearward projection from the sleeve, as by matching pin-receiving holes in the tube and rod. Pivotally connected to the rear end of this rod element of the strut means 72, as by the clevis 88 and pin 90, is a fulcrum-providing linkage means 92 which is maintained in engagement with a fulcrum surface on the intermediate cross member 94 of the lever means 70. In the illustrated embodiment of FIG. 5, this fulcrum linkage means 92 comprises a short flat link element 96, or a pair of such elements welded in parallelism to a terminal element 98 which provides a fulcrum surface engaging a cooperating fulcrum surface on the cross member 94. As shown, this terminal element is a sleeve journaling the cross member. It could of course be of any shape or form providing a fulcrum shoulder engageable with the member and maintained in operative position thereon by any convenient means, as will be understood.

All other elements of the lever means 70, such as the fitting plates 100 and their related parts, the cross member elements 102, 104, the side arms 106, the eyes 108, 110, etc., are the same as the corresponding counterparts in the FIGS. 1, 2 and 3 form.

The leverage action on pulling tension in the line 112 is similar to that of the previously described embodiment except that there is no wide separation of the cooperating fulcrum surfaces of link means and cross member as appears in full lines in FIG. 3.

Moreover, unlike the first described embodiment, where the towing pull is transmitted by the line 6 and not by the strut means 40, in the FIG. 5 form of the invention the strut means 72 can be made to share towing tension with the line 112 by setting the pin and hole adjustment of the rod 86 in the tube 84. If this setting is not made, or if this adjustable feature is not provided, the pulling tension may be confined to the line 112, with the strut means serving merely to hold the lever means properly spaced from the tow truck.

FIG. 4 illustrates an alternative form of the rear portion of the lever means applicable to both the FIG. 1 and the FIG. 5 embodiments. Here the fittings 114 at the ends of the rear cross member 116 are formed on individual rods 118 extending from opposite ends of the cross member and settable in adjusted projection by the usual matching holes and pin means. In this way the span or range of separation of the fittings is increased. Further to enhance the versatility of the hitch, supplementary fittings 120 may be provided on length-adjustable telescoping rods 122 connecting the sleeves of the fittings 114 and points on the side arms 124 of the lever means spaced well forwardly of these fittings, where an additional cross member 126 can be provided. It will be recognized that if the vehicle to be towed is mounted on these forwardly positioned fittings, the work arm of the lever system provided by the lever means is considerably shortened, thus increasing the mechanical advantage of the leverage and enabling the same power source to elevate greater loads.

It is to be understood that, while specific materials form no part of the invention, the various structural elements are to be made of suitable stout structural iron or steel stock capable of fabrication to form strong, rigid framing and other components, and that various details of the exemplifications selected to illustrate the preferred embodiments may be altered within the spirit of the invention and the scope of the appended claims.

I claim:

1. In combination with a tow truck having a winch, a relatively elevated pulley mounted rearwardly of the winch, and a flexible line trained over the pulley having one end secured in winding relation to the winch and its other end hanging free from the pulley,
   a hitch for effecting a lifting-pulling connection of said line to a vehicle to be towed comprising
   lever means having an intermediate fulcrum surface and terminating at its rear end in fittings adapted to be secured in supporting connection to laterally spaced points on an end portion of the vehicle to be towed,
   means connecting the forward end of the lever means to the free end of the flexible line,
   strut means having its forward end pivoted to a lower rear portion of the tow truck, and
   fulcrum-providing linkage means connected to the rear end of the strut means and connected to the lever means adjacent to the fulcrum surface of the lever means,
   whereby the strut means holds the lever means spaced rearwardly from the truck, and
   whereby, when the fittings are connected to the vehicle to be towed, operation of the winch will turn the lever means to swing its forward end forwardly and upwardly and its rear end upwardly by leverage about the engaged fulcrum-providing linkage means and the fulcrum surface of the lever means.

2. The combination claimed in claim 1, in which
   the lever means comprises a cradle having two laterally spaced arms rigidly connected by an intermediate cross bar providing said fulcrum surface.

3. The combination claimed in claim 2, in which
   said arms are arcuately curved upwardly, and rearwardly of the cross bar.

4. The combination claimed in claim 2, in which
   the strut means includes a pair of laterally spaced arms, and
   the fulcrum-providing linkage means comprises short straps pivoted to the rear ends of the arms and providing fulcrum edges for engaging the fulcrum surface of the lever means.

5. The combination claimed in claim 2, in which
   the fulcrum surface of the lever means is a surface of substantially the midpoint of the cross bar, and
   the fulcrum-providing linkage means comprises a sleeve journaling the cross bar at said mid-point.

6. The combination claimed in claim 2, in which
   the cradle arms are arcuately curved upwardly, forwardly and rearwardly of said cross bar,
   the strut means includes a pair of laterally spaced arms, and
   the fulcrum-providing linkage means comprises short straps pivoted to the rear ends of the arms of the strut means and providing fulcrum edges for engaging the fulcrum surface of the lever means.

7. The combination claimed in claim 2, in which
   the cradle arms are arcuately curved upwardly, forwardly and rearwardly of said cross bar,
   the fulcrum surface of the lever means is a surface of substantially the mid-point of the cross bar, and
   the fulcrum-providing linkage means comprises a sleeve journaling the cross bar at said mid-point.

8. The combination claimed in claim 2, in which
   the cradle arms are curved upwardly, forwardly and rearwardly of said cross bar,
   the strut means includes a pair of laterally spaced arms,
   the fulcrum surface of the lever means comprises laterally spaced apart portions of the cross bar, and the fulcrum-providing linkage means comprises short straps pivoted to the rear ends of the arms of the strut means and providing fulcrum edges for engaging said spaced apart portions of the cross bar, whereby continuing operation of the winch will pull the line to swing the lever means initially to bring said spaced apart portions of the cross bar into contact with the straps and subsequently to elevate the connected end of the vehicle to be towed by leverage of the lever means about said straps, with the strut means holding the lever means spaced from the tow truck and pulling tension of the truck transmitted to the vehicle through the line and the lever means.

* * * * *